US011995500B2

(12) United States Patent
Rössl

(10) Patent No.: US 11,995,500 B2
(45) Date of Patent: May 28, 2024

(54) METHOD FOR LOCATING AN ELECTRONIC SHELF LABEL

(71) Applicant: VusionGroup GmbH, Fernitz-Mellach (AT)

(72) Inventor: Andreas Rössl, Fernitz-Mellach (AT)

(73) Assignee: VusionGroup GmbH, Fernitz-Mellach (AT)

( * ) Notice: Subject to any disclaimer, the term of this patent is extended or adjusted under 35 U.S.C. 154(b) by 0 days.

(21) Appl. No.: 17/617,686

(22) PCT Filed: Jun. 14, 2019

(86) PCT No.: PCT/EP2019/065718
§ 371 (c)(1),
(2) Date: Dec. 9, 2021

(87) PCT Pub. No.: WO2020/249232
PCT Pub. Date: Dec. 17, 2020

(65) Prior Publication Data
US 2022/0237392 A1    Jul. 28, 2022

(51) Int. Cl.
*G06K 7/10* (2006.01)
*H02J 50/10* (2016.01)
*H02J 50/40* (2016.01)

(52) U.S. Cl.
CPC .......... *G06K 7/10306* (2013.01); *H02J 50/10* (2016.02); *H02J 50/40* (2016.02)

(58) Field of Classification Search
CPC ............ G06K 7/00; G06K 7/08; G06K 7/081; G06K 7/10306; H02J 50/10; H02J 50/40

USPC ................. 235/451, 439, 435, 375
See application file for complete search history.

(56) References Cited

U.S. PATENT DOCUMENTS

| 2007/0013479 | A1* | 1/2007 | Goel ..................... G09F 3/208 |
| | | | 340/815.45 |
| 2013/0116960 | A1* | 5/2013 | Weyn .................. G01S 5/02521 |
| | | | 702/94 |
| 2014/0201042 | A1* | 7/2014 | Meyer ................. G06Q 10/087 |
| | | | 705/28 |

(Continued)

FOREIGN PATENT DOCUMENTS

| JP | 2022038364 | A | * | 3/2022 | |
| WO | WO-2016187001 | A1 | * | 11/2016 | ........... A47F 5/0068 |

*Primary Examiner* — Edwyn Labaze
(74) *Attorney, Agent, or Firm* — Studebaker & Brackett PC

(57) ABSTRACT

The invention relates to a method for locating an electronic shelf label with an unknown location, in particular in the form of an electronic shelf label display, of an electronic shelf labelling system, wherein the system comprises a number of access points with known locations, which are positioned in different positions at a distance from a shelf, wherein the shelf has at least one shelf edge strip and wherein one of the shelf edge strips has at least one electronic shelf label that is designed such that it can be contactlessly supplied with power, and an electronic power supply device located on the shelf edge strip and designed for contactlessly supplying the at least one shelf label with power, wherein the method comprises the following method steps: determining the position of the electronic supply device in relation to the access points with known locations using an ultra-wide-band radio communication between the access points and the power supply device.

20 Claims, 5 Drawing Sheets

(56) References Cited

U.S. PATENT DOCUMENTS

2014/0316901 A1\* 10/2014 Grabovski ......... G06Q 30/0268
                                                      705/14.65
2015/0169907 A1\*  6/2015 Chang ................... H02J 7/0047
                                                       340/10.6
2016/0035012 A1\*  2/2016 Abell ................. G06Q 30/0641
                                                       705/27.1

\* cited by examiner

METHOD FOR LOCATING AN ELECTRONIC SHELF LABEL

TECHNICAL FIELD

The invention relates to a method for locating an electronic shelf label.

BACKGROUND

A method of this type is known from international patent application with the publication number WO2015/172822A1. In said method, in a group of electronic shelf labels which are realized as electronic shelf label displays, referred to in the technical jargon as ESLs for short, and are assigned wirelessly (by initial registration) to a single access point, a shelf label display of unknown location is located with the aid of a group of shelf label displays of known location. The shelf label displays of unknown location are in this case located exclusively by evaluating a locating signal which is generated, sent and also received in the group of shelf label displays. The shelf label displays of known location form the reference system within which the shelf label display of unknown location is sought.

This method is very efficient. However, the quality of the locating result which is ultimately perceived by the user of the system depends on the condition that the position of the shelf label displays of known location must not change within the space. A situation deviating from this condition would result, for example, if a whole shelving unit including the shelf label displays installed on it is moved from one location to another (new) location within a business premises, the new location still being within the wireless range of the access point to which the affected (moved) shelf label displays are wirelessly assigned. If the new locations of the affected shelf label displays were not then corrected manually in the electronic ESL management system of the business, the locating results achievable with the aid thereof would be essentially useless or misleading.

The object of the invention is therefore to provide an improved method for locating an electronic shelf label within an ESL system in which the aforementioned problems are overcome.

SUMMARY OF THE INVENTION

This object is achieved by means of a method according to Claim 1. The subject matter of the invention is thus a method for locating an electronic shelf label of unknown location, in particular realized as an electronic shelf label display, of an electronic shelf label system, the system comprises a number of access points of known location, which are positioned at different positions, each at a distance from a shelving unit, the shelving unit comprises at least one shelf edge strip, and one of the shelf edge strips comprises at least one electronic shelf label, which is designed such that it can be supplied with energy contactlessly, and an electronic supply device which is located on the shelf edge strip and is designed for contactless energy supply to the at least one shelf label, wherein the method comprises the following method steps: namely determining the position of the electronic supply device in relation to the access points of known location using ultra-wideband wireless communication between the access points and the supply device.

The measures according to the invention are associated with the advantage that, in contrast to known measures, the location determination for one but also more shelf label(s) is no longer dependent on the absolute position of other shelf labels being known, which act as static anchor points for the position determination in these known measures. Rather, dynamic anchor points, realized by the supply devices, are now used. These can change their position in space over time, for example as a result of repositioning of the shelving unit or else a reorganization of the shelves to which the shelf edge strips are fastened. Therefore, before a location determination for a shelf label is carried out, a location determination for the supply device is carried out first, and on the basis thereof, that is to say, in relation to this position of the supply device, the position of a shelf label is determined or narrowed down. The fact that the shelf label whose position is to be determined or narrowed down is on the shelf edge strip on which the relevant supply device is also provided or located ultimately comes into play here. Therefore, as soon as the respective position of the supply device has been determined, the position of the shelf label supplied with the aid of the relevant supply device results de facto automatically, because said shelf label can only be positioned on the relevant shelf edge strip. Since multiple shelf edge strips are usually installed next to one another and/or one above the other on one shelving unit, and the dimensions (lengths) of the shelf edge strips and the location at which the supply device is mounted on the shelf edge strip are known (e.g. to a server of the business), the orientation of the shelving unit and thus also the orientation of the shelf edge strips can be determined automatically (e.g. with the aid of the aforementioned server) by determining the position of the multiplicity of the supply devices installed on the shelving unit, and thus actually the position of the respective shelf label can be narrowed down to a spatial region in which the respective shelf edge strip is situated.

The focus on the location determination of the individual supply devices has also proven very efficient, because a single supply device can supply a relatively large number of shelf labels, e.g. up to 10, 20 or even many more units. This allows the location of the multiplicity of affected shelf labels to be narrowed down in the simplest manner, as explained above, which considerably accelerates the locating method in question in comparison with other methods which rely on individual communication between the affected shelf label and the access points.

Ultra-wideband wireless communication means wireless communication based on ultra-wideband (UWB) technology. The most important feature is the use of extremely wide frequency ranges with a bandwidth of at least 500 MHz or of at least 20% of the arithmetic mean of the lower and upper limit frequencies of the frequency range used.

Further particularly advantageous embodiments and developments of the invention result from the dependent claims and also the following description. In this case, features of one claim category can be developed in accordance with the features of the other claim category, so that the effects and advantages listed in connection with the one claim category are also present for the other claim categories.

Such an electronic shelf label can provide or fulfil a wide variety of functionalities or functions. For example, the shelf label can be configured or accordingly designed e.g. to detect environmental parameters such as e.g. for temperature or moisture detection, or as an input element for receiving an input interaction of a user (e.g. detecting a fingerprint, or a key press) or else as a display medium for presenting information for the user, namely as a shelf label display. In any case, the shelf label is designed such that it can be attached to the shelf edge strip in question and is supplied there with energy in the manner described in detail in the following.

In the method, the determination of the position of the electronic supply device is based on determining the distance between it and each of the involved access points using the respective ultra-wideband wireless communication. A "Flight-of-Time" measurement and, where necessary, an "Angle-of-Arrival" determination are used for this. This entails a very precise determination of the location of the respective supply device by the following measures such as e.g. triangulation, etc.

After the location of the supply device has been determined, the at least one electronic shelf label installed on the shelving unit is identified during energy supply thereof.

The energy supply starts the electronics of the shelf label so that the shelf label is ready with its functionality. Then, during energy supply to the shelf label, it is identified by requesting its unique identifier. This request is also carried out by the supply device. The identifier thus determined is made available at the supply device for retrieval or, in the event of further communication (wired or wireless), forwarded for further processing.

Contactless energy transmission takes place such that, for this purpose, at least one first conductor loop is used, which is formed on the shelf edge strip and is connected by way of its two loop connectors to the supply device and is used for inductive coupling to a locally corresponding second conductor loop (located in the vicinity) of the shelf label. If the conductor loop extends along the entire length of the shelf edge strip, all the shelf labels positioned along the shelf edge strip can be identified in this manner and thus the conclusion can be drawn that all these identified shelf labels are positioned in the vicinity of the position of the supply device and in any case along the shelf edge strip there. In this case, the shelf labels can be programmed such that they output their identifier (once or multiple times) at randomly selected times within a time window in order to ensure individual receipt at the supply device. An anti-collision method known for example from RFID technology can also be used during this contactless transmission in order to ensure individual receipt at the supply device.

For the (more exact/precise) determination of the position of a shelf label along the shelf edge strip, however, multiple first conductor loops are preferably used, which are positioned at different locations along the shelf edge strip. These can be used to realize a spatial resolution along the shelf edge strip, that is to say, along its longitudinal extent. The accuracy of the location determination depends in this case on the number and also the length of the zones covered with the aid of the individual first conductor loops.

The supply device is used to carry out, with the aid of the individual first conductor loops, a spatially limited, that is to say, an individual energy supply at the location of the respective first conductor loop, if a shelf label is positioned there. Since the supply device is informed of how many first conductor loops are fastened to its shelf edge strip and in what order and at what distances (measured from its own position or measured relatively from one conductor loop to the next) they occur along the shelf edge strip, the position of the respective shelf label which can be activated and identified by energy supply, along the shelf edge strip can be determined.

The contactless energy supply to be carried out with the aid of the supply device can be based on a proprietary technical solution or on a standardized technology such as e.g. RFID technology. Particularly preferably, however, an NFC interface is used for contactless energy supply and in particular identification both on the side of the shelf label and on the side of the supply device. In this context, the first conductor loop formed on the shelf edge strip forms a constituent of the NFC interface of the supply device. The same also applies in the case of multiple such first conductor loops, wherein the supply device is preferably designed for individual use of the respective first conductor loop in this case, in order for example to use the first conductor loops sequentially one after the other. In this case, the supply device is preferably designed for selective (or else sequential) switchover (multiplexing) between the first conductor loops in order always to use only one individual first conductor loop. Such a switchover can be realized e.g. with the aid of what is referred to in the field of electronics as an "analogue switch".

RFID stands for "Radio Frequency Identification". technology is specified e.g. in the standard ISO/IEC 18000.

NFC stands for "Near Field Communication". The technology is specified e.g. in the standards ISO/IEC 13157, -16353, -22536, -28361 etc.

However, using the explained NFC interface means not only that the position of an electronic shelf label can be determined, but also that image contents to be reproduced with the aid of this shelf label (realized as a shelf label display) can be defined, that is to say, transmitted to the electronics of the shelf label. This preferably takes place during the time period in which the shelf label is supplied with energy, that is to say, its electronics are active, during which corresponding command and/or image data are transmitted to the shelf label. In order to show static image information with the aid of the display unit also during a time period without energy supply, during which the electronics of the shelf label are inactive, the shelf label display comprises an energy-saving display unit, in particular based on electronic ink or electronic paper technology, etc. These terms substantially stand for the principle of an electrophoretic display which contains e.g. positively charged white particles and negatively charged black particles in a transparent, viscous polymer. By briefly applying a voltage at electrodes, between which the medium made up of particles and polymer is arranged, either the black Particles are placed in front of the white particles or vice versa in the viewing direction. This arrangement is then maintained for a relatively long time (e.g. a few weeks) without further energy supply. If the display is segmented accordingly, e.g. letters, numbers or images can be realized with relatively high resolution in order to display said information. Such a reflective screen can however also be realized with the aid of other technologies, which are known e.g. under the term "electrowetting" or "MEMS". The screen can be designed e.g. as mentioned for black and white display, for greyscale display, for black, white and red display or else for black, white and yellow display. Future developments, which enable a full-colour or even multi-colour display, should also be included. Such a screen is very generally a reflective, that is to say passive, non-self-illuminating display, in which the—relatively static—information display is based on light generated by an external (artificial or natural) light source shining onto the screen and being reflected from there to the observer.

The shelf label or its display unit is supplied with energy on the one hand and data on the other hand with the aid of the NFC interface. During energy supply via the NFC interface, data can thus also be transmitted via this NFC interface, said data being processed by the display unit to the effect that the image content of its screen changes. After the image content has finished changing, corresponding status information representing the successful change of the image content can also be output by the display unit via the NFC interface. After the image content has finished changing, where applicable also after the status information has been output, the energy supply via the NFC interface can be terminated, after which the image content of the screen remains unchanged until the next desired change.

The use of said technologies in particular allows the shelf label to be realized without its own energy supply such as a battery or a rechargeable battery for example, which are both relatively expensive. For the purposes of maintenance or replacement of the battery or rechargeable battery, a conventional shelf label must also be designed such that said energy storage devices are replaceable. Where necessary, only a capacitor for short-term, temporary smoothing or stabilization of the internal supply voltage is still used in the shelf label in question. The shelf label is therefore designed such that its electronics for communication or for updating the screen content, in particular its electronic control, are only ever active when it is supplied with the aid of the external electronic supply device. The housing can be completely and permanently encapsulated, because it is no longer necessary to replace the energy storage device, and therefore it can only be opened for recycling purposes (e.g. with a special tool).

A shelf label which is reduced to a few, absolutely necessary electronic components and is therefore also extremely inexpensive can thus be realized. This extremely reduced shelf label has only one basic functionality, such as e.g. standardized NFC communication with standardized energy supply during NFC communication. These tasks can be realized with the aid of a simple NFC controller. Updates of the screen of the energy-saving display unit and the associated status report are not dealt with directly by the shelf label in wireless communication with an access point, as is the case in known systems, but rather is handled by the interposed supply device, which for its part can be in contact with the access point via a suitable (and essentially freely selectable) wireless communication method.

For the wireless communication with the access point, a time slot communication method can be used, in particular a proprietary time slot communication method such as that known from WO2015/124197, pages 2 to 4, the specific disclosure of which is hereby incorporated by reference. However, a communication protocol based on the standards or specifications ZigBee, Bluetooth or WiFi etc. can also be used for wireless communication.

Accordingly, in addition to a wireless module which provides the UWB functionality, at least one further wireless module which provides one of the aforementioned wireless technologies can be provided both at the access point and at the supply device. Each of the separate wireless modules can have its own antenna configuration, which consists of a single antenna or a number of individual antennas, and contain associated electronics. The allows the UWB wireless communication to be used exclusively for location determination, while communication via the further wireless module is freely available parallel thereto to control the shelf label via the supply device.

In order to ultimately come to an absolute location of the supply device in the premises of a business such as a supermarket, position-relevant results of the ultra-wideband wireless communication are transmitted in a wired or wireless manner either from the supply device or from the involved access point to a data processing device to determine the location of the supply device(s). These position-relevant results can be the determined distances between the communication partners (supply device and access point) or else the signal transit times during communication between the communication partners, from which the position of the respective supply device in relation to the access points is determined, from which the absolute position of the respective supply device can then be determined on the basis of the knowledge of the exact position of the involved access points, which is more accurate the more access points are involved.

Furthermore, the identity of a shelf label identified during the energy supply thereof by the supply device is communicated to said data processing device, and the location of the relevant shelf label relative to the previously determined location of the relevant supply device is at least narrowed down at the data processing device. As mentioned, the dimensions (longitudinal extent) of the respective shelf edge strips can for example be taken into account, which ultimately defines the permissible limits for the distance between an identified shelf label and the supply device supplying this shelf label on the relevant shelf edge strip.

However, anchor points which are variable in position and therefore dynamic, in the form of the supply devices, can also be used for other purposes within a business premises. For instance, according to a further aspect, the position of a movable object can be at least narrowed down by ultra-wideband wireless communication between it and at least one of the supply devices. This movable object can be, for example, a shopping trolley, a shopping basket, or else a customer's smartphone and the like. All these objects can be equipped with an ultra-wideband wireless system. This measure can be used to establish whether the movable object, ultimately the user of the object, stops in front of a shelving unit, and in particular which shelving unit the user is in front of.

By repeatedly narrowing down the position of the movable object, a path of movement of the object can be determined. This measure can be used to predict the time at which a user arrives in front of a specific shelving unit or a specific shelf edge strip or else state the time period during which a user stays in front of a shelving unit or shelf edge strip.

In this connection, it has furthermore proven particularly advantageous when information corresponding to the position of the object is displayed either via a screen of the object or via a shelf label, that is to say, via its display unit, positioned in the vicinity thereof. This enables location- or else behaviour-specific provision of information for the user or customer. This functionality can be triggered, for example, by the object passing a threshold value of a distance from the supply device or spending longer than a predefined time period within a zone which is defined by the distance from a single shelf label display or the distances from a number of such supply devices.

In summary, the invention allows two-stage locating of electronic shelf labels wherein, in a first step, the position of one or more supply device(s) is determined first, and then, in a second step, the position of a shelf label is narrowed down in the context of energy supply by means of the supply device. However, the two method steps can also occur in the reverse order. It is immaterial in this case, whether the supply device always stays in the same place or not, because its relative position in relation to access points installed at fixed positions can be determined or updated again and again and above all relatively quickly with the aid of the ultra-wideband wireless communication used. The multiplicity of supply devices within a business premises therefore realize anchor points, which are dynamically variable in terms of their own position, for locating the shelf labels assigned to them (to be supplied with energy by them) in each case.

In summary, the supply device implements, for the shelf edge strip in question, a combined energy supply and communication supply device for the shelf labels fastened to the relevant shelf edge strip. The supply device is thus configured or designed for local contactless energy transmission and local contactless communication with shelf labels fastened to the shelf edge strip. Such a supply device can also be referred to as a shelf edge strip control device or shelf edge strip controller, because it controls all the activities of the shelf labels mounted on the relevant shelf edge strip, which includes the display behaviour or other functionalities mentioned in the introduction, the communication behaviour and the respective energy supply.

The electronics of the various devices of the system, just like also the interface etc. thereof can be realized with the aid of very wide range of passive and also active electronic components in a discrete and also integrated manner. Preferably, a microprocessor with corresponding peripheral components or microcontroller, upon which a software for providing the various functionalities is executed, is used in this case. Also, what are known as ASICs (Application-Specific Integrated Circuits) can be used.

These and further aspects of the invention result from the figures discussed below.

BRIEF DESCRIPTION OF THE FIGURES

The invention is explained once more in detail in the following with reference to the attached figures on the basis of exemplary embodiments, to which the invention is not restricted, however. In the various figures, identical components are provided with identical reference numbers. In the figures.

DESCRIPTION OF THE EXEMPLARY EMBODIMENTS

Figure 1:
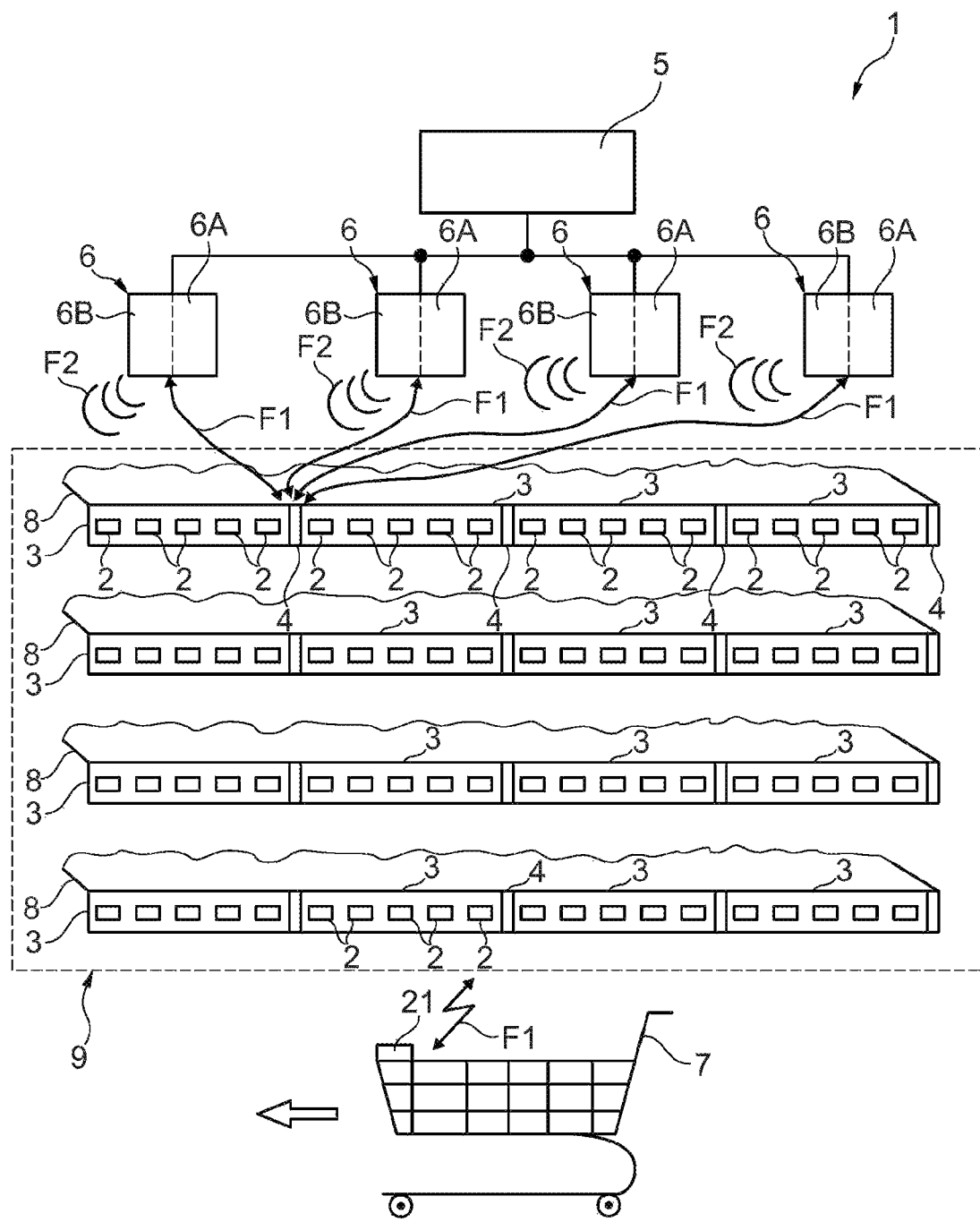
FIG. 1 schematically shows an electronic shelf label system according to the invention.

FIG. 1 shows a part of a shelf label system 1 in a business premises, which comprises a number of identically constructed, namely NFC-enabled, electronic shelf label displays 2, which are fastened to four "intelligent" shelf edge strips 3 positioned next to one another (in a row along the width of a shelving unit 9), the shelf edge strips 3 being visible substantially in a front view. Each shelf edge strip 3 has an electronic supply device 4 for contactless energy supply of the shelf label displays 2 and for contactless communication with a shelf label display 2 supplied with energy, this being realized with the aid of NFC technology. Also illustrated is a data processing device, which is realized with the aid of a server 5, which is connected in a wired manner to four identically constructed access points 6, the access points being positioned at different locations within a business premises, and the server 5 knowing these locations.

The supply devices 4 illustrated are in wireless contact with e.g. the access point 6 on the far left, to which they are logically assigned, via first wireless signals F1. The image contents of the shelf label displays 2 within the entire business premises can thus be changed from the server 5, and where necessary associated status information can also be requested from the shelf label displays 2 and transmitted to the server 5.

The shelf label displays 2 of other shelving units 9 (not illustrated here) can likewise be logically assigned in groups to the other access point 6 illustrated, so that in each case one access point 6 wirelessly supplies a subset of all the shelf label displays 2 of the business premises.

Each access point 6 has two wireless modules 6A and 6B, wherein both of these are only indicated schematically in the respective access point 6, separated from each other by dashed lines.

The first wireless module 6A communicates by means of the first wireless signal F1 and is used to define the image contents. To do this, it uses ultra-wideband wireless technology (referred to in the technical jargon as UWB technology, UWB standing for "ultra wideband"), and its electronics as well as its antenna configuration (neither illustrated in detail) are designed to implement this technology.

The second wireless module 6B is designed as a supply transmitter and supplies the supply devices 4 with energy selectively by sending directed second wireless signals F2. To this end, the second wireless module 6B has, in addition to its electronics, a number of antennas, with the aid of which the direction of the energy transmission (ultimately the propagation of the second wireless signal F2, which is sent at e.g. 5 watts) can be set relatively precisely, so that the energy to be transmitted arrives exactly at a selected supply device 4. This energy transmission technology is known by the term "power over WiFi", and the electronics and the antenna configuration of the second wireless module 6B are designed accordingly.

The "power over WiFi" functionality, that is to say, the second wireless module 6B, can be integrated in the access point 6 or realized as a separate assembly/separate device, which is e.g. coupled for control to the first wireless module 6A.

Each of the shelf edge strips 3 is mounted on the front edge of an individual shelf 8. The four shelves 8 illustrated all belong to the shelving unit 9, which is indicated only schematically. Different products can be presented on the shelves 8 but are not illustrated in the present case.

In the visualization of FIG. 1, the reference numerals 2 and 4 are entered only for the top shelf edge strip configuration, which shows four shelf edge strips 3, and have largely been omitted from the three configurations of the shelf edge strips 3 below for reasons of simplicity.

Furthermore, FIG. 1 shows a shopping trolley 7, which is being moved past the shelving unit 9 to the left. The shopping trolley 7 has a mobile wireless unit 21, which is designed for ultra-wideband wireless communication. The wireless unit 21 has e.g. battery-operated wireless electronics and an antenna configuration connected thereto (neither illustrated) and establishes a UWB wireless connection to the supply devices 4 within its range with the aid of the first wireless signals F1, on the basis of which the supply devices 4 can determine the distance from the wireless unit 21.

During normal operation, which is referred to as the normal mode of the system 1, all the shelf label displays 2 are assigned wirelessly to the access point 6 on the far left, as mentioned, and the changing of the image contents is controlled with the aid of the first wireless signals F1 via this access point 6 arranged on the far left.

The situation in which the shelf label displays 2 are sought is different by contrast. In this case, which is referred to as the locating mode of the system 1, multiple, in the present case all four, access points 6 are used, and the distance between the respective supply device 4 and the respective access point 6 is determined during communication with, for example, the supply device 4 installed in the top left corner with the aid of the first wireless signals F1, which each of the access points 6 now exchanges with the supply device 4 in UWB wireless communication. The distances thus determined are transmitted to the server 5 via a wired network (LAN), and the server 5 determines the spatial position of the affected supply device 4 with knowledge of the absolute positions of the four access points 6.

A block diagram of the shelf label display 2 is explained below FIG. 2.

Figure 2:
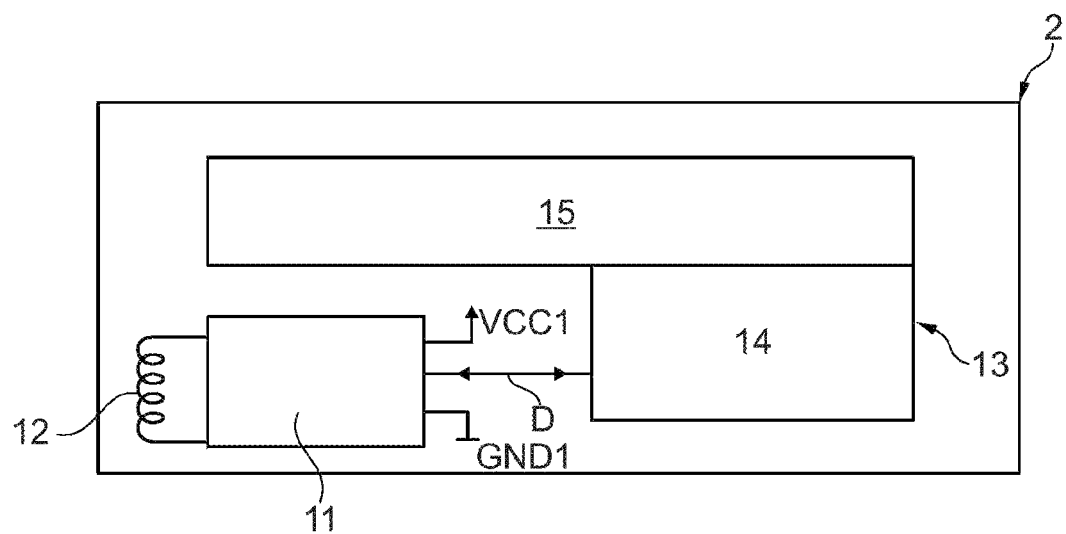
FIG. 2 schematically shows a block diagram of a shelf label display.

The block diagram according to FIG. 2 shows a first NFC interface with its coupling coil 12; NFC stands for "Near Field Communication". With the aid of the coupling coil 12, an inductive coupling is established with another NFC-enabled device, in the present case the supply device 4, specifically with the conductor loops L1 to L5 formed on the shelf edge strip 3 (see FIG. 3), when the coupling coil 12 is brought correspondingly close to one of the conductor loops L1-L5, which is the case when the shelf label display 2 is attached to the shelf edge strips 3. During the inductive coupling, a first supply voltage VCC1 is generated relative to a first reference potential GND1 with the aid of the first NFC interface 11 for the operation of the entire shelf label display 2, which activates the electronics of the shelf label display 2, so that contactless bidirectional communication of data D can also be carried out via its first NFC interface 11. A constituent of these electronics is also an NFC controller, which provides the entire NFC functionality, but is not shown here in detail, but is integrated in the first NFC interface 11.

The block diagram also shows a display unit 13, which is connected to the first NFC interface 11 and is divided into a screen controller realized as an electronic paper display controller 14 and a screen realized as an electronic paper display screen 15 which is connected thereto and can be controlled therewith. With the aid of the controller 14, the data D received is interpreted, the image content of the screen 15 is changed accordingly, where necessary, or else status information in the form of data D is output to the supply device 4 via the NFC interface 11.

A block diagram of the shelf edge strip 3 according to Figure particularly also the supply device 4, is discussed below using FIG. 3.

Figure 3:
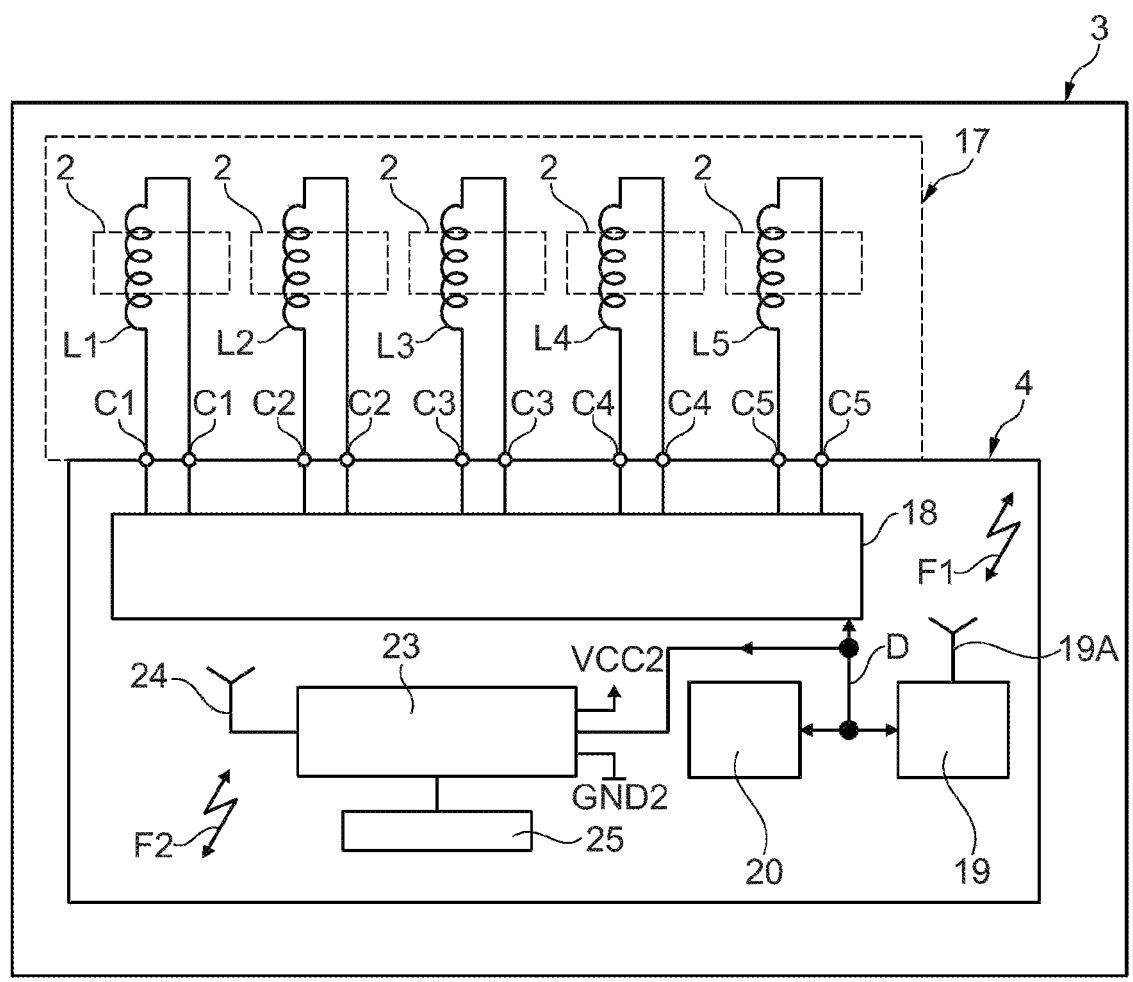
FIG. 3 schematically shows a block diagram of an "intelligent" shelf edge strip with a supply device.

The supply device 4 illustrated in FIG. 3 is designed both for its own contactless supply with energy and also for contactlessly supplying the shelf label displays 2 with energy. For its own supply, it has a supply receiver 23 which is suitable for receiving the second wireless signal F2 and is equipped with an antenna configuration 24 (which can have multiple antennas) and electronics, which are designed to receive the second wireless signal F2 and to store the energy transmitted therewith in an internal electrical energy storage device 25 (chargeable battery, rechargeable battery) and to generate the second supply voltage VCC2 relative to a second reference potential GND2.

During operation, the supply device 4 can query or monitor the state of charge of the energy storage device 25, for example with the aid of its control unit 20. As soon as the state of charge falls below a certain level, the control unit 20 can request a (re)charge with the aid of the first wireless signal 51. This request is received by the access point 6 to which the supply device 4 is logically (wirelessly) assigned. Since the exact geographical position (the three-dimensional coordinates) of each of the supply devices 4 and their unique identifier is known in the system 1 (e.g. the server 5), because e.g. the position was determined previously with the aid of the locating mode, the affected access point 6 can send the second wireless signal F2 in a precisely directed manner towards the position of the respective supply device 4 requesting charging. The second wireless signal F2 is received there, and the energy transmitted with the aid thereof is used to charge the internal energy storage device 25 there.

In the visualization of FIG. 3, a printed circuit board 17 is also indicated, which was omitted from the diagram in FIG. 1 for reasons of clarity. The printed circuit board 17 supports five conductor loops L1 to L5, wherein in the present case these are designed with multiple loops or windings, which is indicated in each case with the symbol for an electric coil. The printed circuit board 17 is integrated into the relatively flat structure of the shelf edge strip 3. The supply device 4 can be soldered to said printed circuit board 17 or connected via cables or plug connectors, so that the conductor loops L1 to L5 are electrically contacted via their loop connectors C1 to C5.

Corresponding to the position of the respective conductor loop L1 to L5, the shelf label display 2 respectively positioned there is also illustrated and indicated. Here, the electrical connection of the loop connectors C1 to C5 to the supply device 4, but in particular to the electronics of its (second) NFC interface 18, is also specifically illustrated. If an inductive coupling with the first NFC interface 11 of the shelf label display 2 is present, the second NFC interface 18 is designed for the contactless transmission of electrical energy to the shelf label display 2 and for bidirectional contactless communication of data with the shelf label display 2 activated by energy transmission. The conductor loops L1 to L5 are multiplexed with the aid of the NFC interface 18 which is specifically designed to do this, therefore only one of the conductor loops L1 to L5 is ever in use. An "analogue switch" known in electronics can be used for this.

The supply device 4 furthermore has an access point communication interface 19, which is designed for wireless communication with the access point 6 illustrated in FIG. 1. It has an antenna configuration 19A, which can also be constructed from multi single antennas, and electronics, with which the first wireless signals F1 can be received and sent. In particular, the access point communication interface 19 is designed for ultra-wideband wireless communication.

The control unit 20 is used to control the internal processes, the energy supply to the shelf label display 2 and communication with the shelf label display 2, and communication with the access point 6. It is realized with the aid of a microcontroller, which is connected to the second NFC interface 18 and the access point communication interface 19 as well as the supply receiver 23 via a bidirectional data bus.

Figure 4:
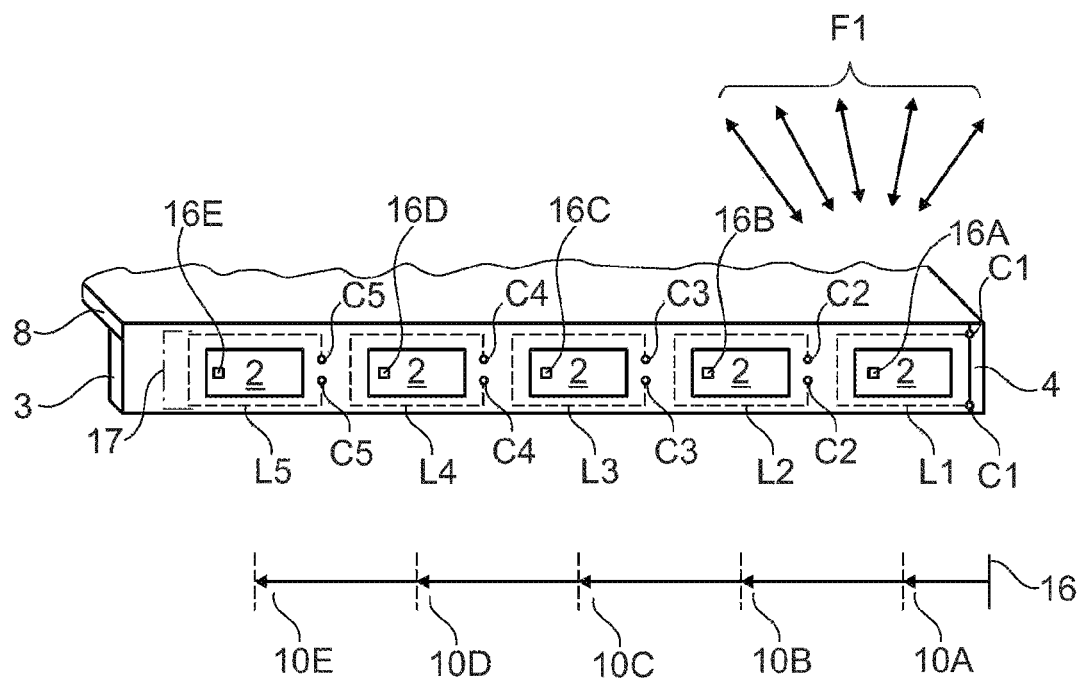
FIG. 4 schematically shows the shelf edge strip in a front view.

In FIG. 4, the shelf edge strip 3 illustrated in the top left corner in the shelving unit 9 is illustrated in a more detailed view. Only the left-hand edge of the printed circuit board 17 supporting the conductor loops L1 to L5 is visible, to avoid overloading the visualization. In this visualization, only the first loop connectors C1 connected to the supply device 4 are illustrated. However, the same applies correspondingly to the remaining four loop connectors C1 to C5, the direct connection of which to the supply device 4 has been omitted for reasons of clarity. It is furthermore illustrated symbolically that each of the shelf label displays 2 contains the uniquely identifying identifier data 16A to 165, which are stored permanently and immutably in an internal memory.

Since the measures with which the position of the supply device 4 (e.g. located in the top left of the shelving unit 9) is determined have been already explained above, the locating of the five shelf label displays 2 fastened to this shelf edge strip 3 is now explained. In the aforementioned locating mode, the supply device 4 then activates the five shelf label displays 2 sequentially. To this end, an inductive coupling is first established via the two NFC interfaces 11 and 18 to the shelf label displays 2 positioned on the far right with the aid of the conductor loop L1 there (on the far right) and in the process energy is transmitted to them so that the electronics of the shelf label display 2 are activated. The unique first identifier data 16A is then retrieved with the aid of the coupled NFC interfaces 11 and 18 and stored in the supply device 4. Then the energy supply, that is to say, the coupling, is terminated, and the shelf label display 2 is deactivated. This process is then carried out step by step for each of the other conductor loops L2 to L5 until all the unique identifier data 16A to 165 are present in the supply device 4. The unique identifier data 16A-16E thus determined are then output via the access point communication interface 19 to the access point 6 responsible for the relevant supply device 4, which in the present case is the access point 6 illustrated on the far left in FIG. 1. From there, these identifier data 16A to 165 are forwarded to the server 5, which has already determined the absolute position of the supply device 4 located in the top left corner and which is also informed of the dimensions of the shelf edge strip 3 and the positions or coverage zones of the respective conductor loops L1 to L5 along the shelf edge strip 3. From this information, in particular from the relationship between the respective conductor loop L2 to L5 (e.g. the order in which they are used) and the identifier data 16A to 16E obtained via the respective conductor loop L2-L5, the server 5 then determines the respective shelf label display position 10A to 10E for each shelf label display 2 along the shelf edge strip 3, e.g. measured from a known reference position 16, e.g. the known position of the supply device 4, or else from the right or left edge of the shelf edge strip 3.

If the orientation of the shelf edge strip 3 in space is clear to the server 5, which can be determined e.g. by determining and thus also knowing some or else all positions of the supply devices 4 of the shelving unit 9, the clear position of each of the shelf label displays 2 in space can also be determined by the server 5.

A use scenario for the method for locating the electronic shelf label displays 2 is described below with the aid of FIGS. 5A and 5B.

Figures 5A, 5B:
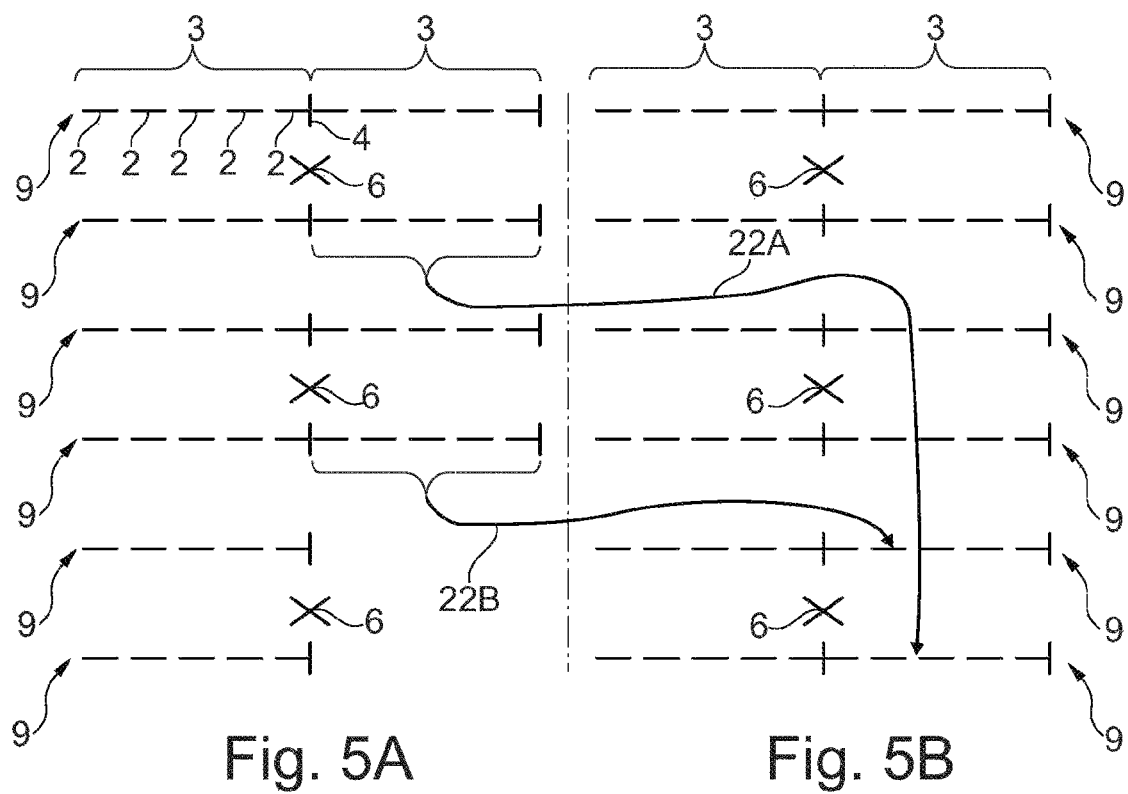
FIG. 5A-5B schematically shows an arrangement of such shelf edge strips, changing over time.

It can be assumed here that a starting configuration of the shelving units 9 is illustrated in FIG. 5A, and a final configuration of the shelving units 9 is illustrated in FIG. 5B, the two FIGS. 5A and 5B being separated from each other with the aid of a dividing line. The shelving units 9 illustrated are illustrated as viewed from above, and two adjacent shelf edge strips 3 are illustrated per shelving unit 9 in each case. The structure of shelf label displays 2 and supply device 4 illustrated in the top left corner is replicated over the two columns and four rows of the shelving unit 9 illustrated, and therefore only the top left shelf edge strip 3 has been provided with reference numerals, for reasons of clarity. FIGS. 5A and 5B additionally show three access points 6, which are installed on the ceiling of a business premises in which the shelving units 9 are erected, at positions between the shelving units 9.

It can be seen that the two bottom right shelving unit positions in FIG. 5A are not occupied by shelving units 9. Proceeding from the starting configuration according to FIG. 5A, in the transition to the final configuration according to FIG. 5B, two of the shelving units 9 are moved according to the arrows 22A and 22B to the free shelving unit positions in the starting configuration.

In order to locate the shelf label displays 2 now, locating mode is activated, and the positions of the individual supply devices are first determined with the aid of the UWB wireless communication as explained. For the supply devices 4 for which only a slight or no change in location results, the method is terminated here already, because it is assumed that the associated shelf edge strips 3 have not been subjected to any change in location.

For the supply devices 4 which are now installed on the shelving units 9 which have changed position according to the arrows 22A and 22B and therefore for which a change in position going beyond a threshold value has been established, in a second step, the shelf label displays 2 installed there are identified during individual energy supply thereto, and the identifier data 16A to 16E thus obtained are transmitted to the server 5 for defining the respective position of each shelf label display 2. The system 1 then reassumes normal mode.

The supply devices 4 located at their new positions then simply log in wirelessly to the closest access point 6, because they are already known in the system 1 and have been registered previously, and are available there as usual. A re-registration at the closest access point 6 can also take place.

However, it should be mentioned at this point that the previously explained termination of the method for the supply devices 4 which have not changed position does not necessarily have to take place. The method can also be executed as explained above for these supply devices 4, that is to say, applied to all the supply devices 4 and the shelf label displays 2 supplied thereby, which ultimately leads to the taking of a full inventory of the shelf label displays 2. This may make sense all the positions are to be determined deliberately or a test is carried out as to whether individual shelf label displays 2 have been removed from the shelving units involved or the shelf edge strips 3 there (although they have not been moved) or moved to other locations or displaced along the shelf edge strips 3 etc.

With the new positions thus determined, the digital three-dimensional map of the shelf label displays 2 is adapted to the reality now present in the business premises or an existing three-dimensional map is verified with the aid of the server 5.

With the aid of the access point communication interface 19 designed for ultra-wideband wireless communication, however, movable objects, which move past or stay in front of the shelving unit 9 like the shopping trolley 7 illustrated in FIG. 1, can also be tracked or identified with the aid of the first wireless signals F1. After it has successfully been detected that such a shopping trolley 7 is in a predefined region in front of e.g. the second shelf edge strip 3 from the left on the bottom shelves, specific information relating to the products presented there can be displayed via the shelf label displays 2 fastened to this shelf edge strip 3 with the aid of the supply device 4 installed there.

According to a further exemplary embodiment, the access point 6 can also be designed such that the first wireless module 6A with its UWB technology is only used for distance determination and, together with other access points 6, for position determination. The second wireless module 6B can be configured and used for energy transmission, as explained. In addition to this, a third wireless module (not illustrated) can also be realized, which is designed for communication of display contents, commands or status messages according to e.g. a proprietary time slot communication method mentioned in the general part of the description or a standardized communication method (Zig-Bee, Bluetooth, . . . ). Accordingly, the electronic supply device 4 also has, instead of the two wireless interfaces 19, 23 illustrated in FIG. 3, an additional wireless interface for communication with the third wireless module, the access point 6.

A realization of the printed circuit board 17 and the shelf edge strip 3 is also discussed in the following.

Figure 6:
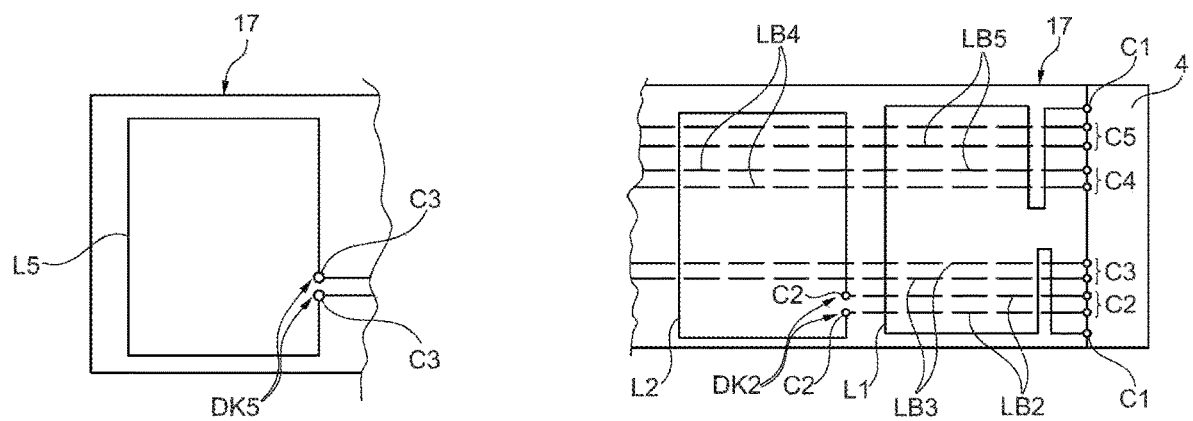
FIG. 6 schematically shows a printed circuit board of the "intelligent" shelf edge strip.

FIG. 6 shows by way of example such a printed circuit board 17, which has conductor tracks on both sides. For reasons of clarity, only three of the five conductor loops L1-L5 are illustrated. The conductor loops L1, L2 and t5, which have a large area, can be seen on the front. On the rear, the conductor tracks LB2-LB5, running close together, of the respective loop connectors C2 and C5 can be seen, which run along the longitudinal extent of the Printed circuit board 17. The loop connectors C1 run on the front side. The loop connectors C1-C5 are all connected to the supply device 4. There are vias DK2 and DK5 from the front to the rear in the places where the loop connectors C2 and C5 end at the conductor loops L2 and L5, so that the conductor loops L2 and L5 are electrically conductively connected to their loop connectors C2 and C5. The same applies correspondingly to the conductor loops L3 and L4, their loop connectors C3 and C4, their conductor tracks LB3 and LB4, and the two vias DK3 and DK4, which are not shown. The supply device 4 indicated on the printed circuit board 17 can be attached, for example, to the rear of the printed circuit board 17. The electronic components of its electronics can also be soldered directly to the printed circuit board 17.

Figure 7:
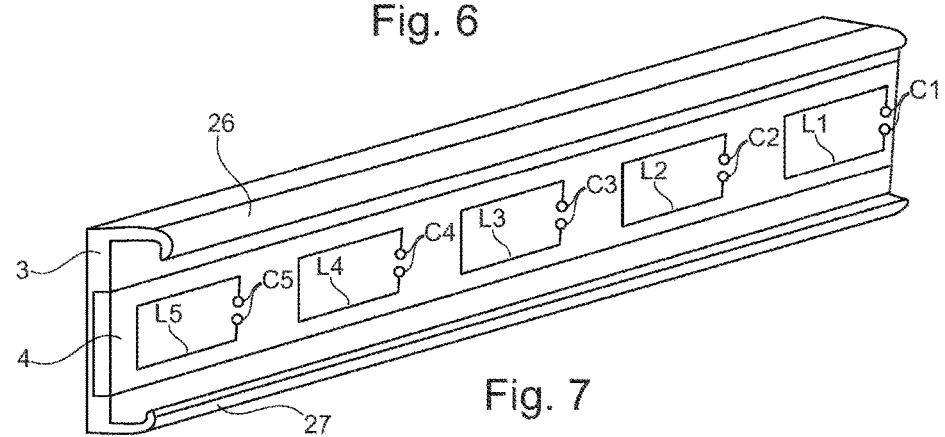
FIG. 7 schematically shows the printed circuit board according to FIG. 6 integrated in the shelf edge strip.

FIG. 7 finally shows a possibility of mechanically integrating the printed circuit board 17 in the shelf edge strip 3. The printed circuit board 17 forms a part of the wall of a receiving slot, which is used to receive a number of shelf label displays 2. At the point where the printed circuit board 17 is to be attached, the receiving slot has a depression which corresponds to the thickness of the printed circuit board 17 and into which the printed circuit board 17 is inserted so that its front runs substantially planar with the rest of the wall of the receiving slot. On the front of the shelf edge strip 3, an upper guide strip 26 is formed on the upper end and a lower guide strip 27 is formed on the lower end. These guide strips 26 and 27 can be bent upwards and downwards until the shelf label display 2 can latch in. In addition, the shelf label display 2 can be displaced unhindered along the shelf edge strip 3 and positioned completely freely. The accommodation of the supply device 4 on the rear of the printed circuit board 17 is advantageous if it should be possible to displace the shelf label displays 2 along the front of the shelf edge strip 3 unhindered, as is possible in the present case. For this case, the depression in the receiving slot must be adapted accordingly so that there is also space for the electronic components of the supply device 4.

Figure 8:
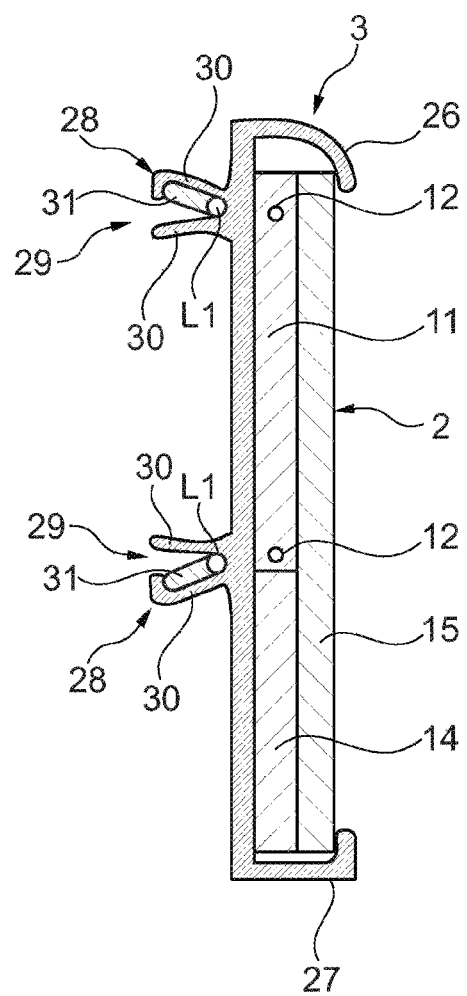
FIG. 8 schematically shows the "intelligent" shelf edge strip with direct integration of a conductor loop.

FIG. 8 shows the shelf edge strip 3 in a cross-sectional illustration, with a conductor loop mount 28 on its rear side, the conductor loop mount 28 being manufactured directly from the material of the shelf edge strip 3 (that is to say, from the plastic). The conductor loop mount 28 has a gap-like depression 29, into which a wire of the conductor loop L1 is inserted in an immovable manner. The gap-like depression 29 is flanked by two walls 30, which are dimensioned in such a manner that with their aid, a snap mechanism is realized, which fixes the wire in its intended position. A band- or strip-like material 31 (material band or strip) is inserted into the gap-like depression 29 for this purpose, which on the one hand presses the wire of the conductor loop L1 against the base of the depression 29 and on the other hand supports itself on a lug- or hook-like end of the outer wall 30 in each case or latches there.

However the integration of the conductor loop(s) L1 (to L5) into the shelf edge strip 3 or the fastening of the conductor loop(s) L1 (to L5) to the shelf edge strip 3 is realized, it has furthermore proven particularly advantageous that the electronic supply device 4 is integrated into the shelf edge strip or is fastened to the same. Thus, a shelf edge strip with individual electronic energy supply can be realized. In this case, the supply device 4 can e.g. also be formed directly on the printed circuit board 17 or connected to the same as a module or mechanically coupled to the shelf edge strip 3 as a module and electrically conductively connected to the conductor loop L1 (to L5) of the shelf edge strip 3. As a result, the shelf edge strip 3 as a whole, including its supply device 4, can be taken out and recommissioned at a different location without problem.

Neither FIG. 7 nor FIG. 8 shows a fastening mechanism for the shelf edge strip 3, which allows the fastening of the shelf edge strip 3 on a different structure, such as e.g. a shelf 8, because this detail does not relate to the invention and can be realized in a wide range of ways that are known to the person skilled in the art.

Finally, it is once more pointed out that the figures previously described. in detail are only concerned with exemplary embodiments, which can be modified in many different ways by the person skilled in the art, without departing from the scope of the invention. For the sake of completeness, it is also pointed out that the use of the indefinite article "a" or "an" does not mean that the relevant features cannot also be present multiple times.

The invention claimed is:

1. A method for locating at least one electronic shelf label of unknown location, the at least one electronic shelf label being at least one electronic shelf label display, of an electronic shelf label system,
   wherein the system comprises:
   at least one access point of known location, which are positioned at different positions, each at a distance from a shelving unit,
   the shelving unit comprises at least one shelf edge strip, and
   one of the shelf edge strips comprises:
   the at least one electronic shelf label, which is configured to be supplied with energy contactlessly, and
   an electronic supply device located on the shelf edge strip and configured for contactless energy supply of the at least one electronic shelf label, wherein the method comprises:
  determining a position of the electronic supply device in relation to the at least one access point of known location using ultra-wideband wireless communication between the at least one access point and the electronic supply device,
  sending identification data from the at least one electronic shelf label to the electronic supply device, and
  estimating a position of the at least one electronic shelf label based on the identification data sent to the electronic supply device and based on the determined position of the electronic supply device.

2. The method according to claim 1, wherein the determination of the position of the electronic supply device is based on determining the distance between it and each of the at least one access point using the ultra-wideband wireless communication.

3. The method according to claim 2, wherein, during energy supply of the at least one electronic shelf label, the at least one electronic shelf label is identified by requesting its unique identifier.

4. The method according to claim 1, wherein the at least one electronic shelf label installed on the shelving unit is identified during energy supply thereof.

5. The method according to claim 1, wherein, for contactless energy transmission, at least one first conductor loop is used, which is formed on the shelf edge strip and is connected by way of its two loop connectors to the electronic supply device and is used for inductive coupling to a locally corresponding second conductor loop of the at least one electronic shelf label.

6. The method according to claim 5, wherein, to determine the position of the at least one electronic shelf label along the shelf edge strip, a plurality of first conductor loops are used, which are positioned at different locations along the shelf edge strip.

7. The method according to claim 6, wherein the electronic supply device is used to carry out an individual energy supply at the location of the respective first conductor loop, if one or more of the at least one electronic shelf label is positioned there.

8. The method according to claim 1, wherein an NFC interface is used for contactless energy supply and for identification both on the side of the at least one electronic shelf label and on the side of the electronic supply device.

9. The method according to claim 1, wherein the at least one electronic shelf label comprises an energy-saving display unit, the energy-saving display unit being an electrophoretic display with which static image information is displayed by the energy-saving display unit even during a time period without energy supply.

10. The method according to claim 1, wherein position-relevant results of the ultra-wideband wireless communication are transmitted in a wired or wireless manner either from the electronic supply device or from the at least one access point to a data processing device to determine the location of the electronic supply device.

11. The method according to claim 10, wherein the identity of the at least one electronic shelf label is identified during the energy supply thereof by the electronic supply device and the identity of the at least one electronic shelf label is communicated to the data processing device, and the location of the at least one electronic shelf label relative to the location of the electronic supply device is at least narrowed down at the data processing device.

12. The method according to claim 1, wherein the system comprises a plurality of electronic supply devices, and a position of a movable object is at least narrowed down by ultra-wideband wireless communication between it and at least one of the electronic supply devices.

13. The method according to claim 12, wherein, by repeatedly narrowing down the position of the movable object, a path of movement of the object is determined.

14. The method according to claim 12, wherein information corresponding to the position of the movable object is displayed either via a screen of the movable object or via one or more of the at least one electronic shelf label which is positioned in the vicinity of the movable object.

15. The method according to claim 1, wherein the estimated position of the at least one electronic shelf label is a range of distances from the electronic supply device, the range of distances corresponding with a length of the at least one shelf edge strip.

16. The method according to claim 15, wherein the range of distances is less than or equal to a length of the at least one shelf edge strip.

17. The method according to claim 16, wherein the electronic supply device determines the length of the at least one shelf edge strip by determining a quantity of conductor loops included in the at least one shelf edge strip.

18. A method for locating at least one electronic shelf label of unknown location, the at least one electronic shelf label being at least one electronic shelf label display, of an electronic shelf label system,
  wherein the system comprises:
    at least one access point of known location, which are positioned at different positions, each at a distance from a shelving unit,
    the shelving unit comprises at least one shelf edge strip, and
    one of the shelf edge strips comprises:
      the at least one electronic shelf label, which is configured to be supplied with energy contactlessly, and
      an electronic supply device located on the shelf edge strip and configured for contactless energy supply of the at least one electronic shelf label,
  wherein the method comprises:
    determining a position of the electronic supply device in relation to the at least one access point of known location using ultra-wideband wireless communication between the at least one access point and the electronic supply device, and
    wherein for contactless energy transmission, at least one first conductor loop is used, which is formed on the shelf edge strip and is connected by way of its two loop connectors to the electronic supply device and is used for inductive coupling to a locally corresponding second conductor loop of the at least one electronic shelf label.

19. The method according to claim 18, wherein, to determine the position of the at least one electronic shelf label along the shelf edge strip, a plurality of first conductor loops are used, which are positioned at different locations along the shelf edge strip.

20. The method according to claim 19, wherein the electronic supply device is used to carry out an individual energy supply at the location of the respective first conductor loop, if one or more of the at least one electronic shelf label is positioned there.

* * * * *